United States Patent [19]

Daido et al.

[11] Patent Number: 5,215,800
[45] Date of Patent: Jun. 1, 1993

[54] ERASABLE OPTICAL RECORDING MEDIUM AND METHOD FOR WRITING, READING AND/OR ERASING THEREOF

[75] Inventors: Takahiro Daido, Hino; Takeyuki Kawaguchi, Hachioji, both of Japan

[73] Assignee: Teijin Limited, Osaka, Japan

[21] Appl. No.: 734,342

[22] Filed: Jul. 19, 1991

Related U.S. Application Data

[63] Continuation-in-part of Ser. No. 466,188, Jan. 17, 1990, abandoned.

[30] Foreign Application Priority Data

Jan. 17, 1989 [JP] Japan .................................. 1-5889
Mar. 27, 1989 [JP] Japan .................................. 1-71999

[51] Int. Cl.$^5$ .............................................. B32B 3/00
[52] U.S. Cl. ........................................ 428/64; 428/65; 428/411.1; 428/457; 428/913; 430/945; 346/76 L; 346/135.1; 369/288
[58] Field of Search ............... 428/64, 65, 457, 411.1, 428/913; 396/288; 346/76 L, 135.1; 430/945

[56] References Cited

U.S. PATENT DOCUMENTS

| | | | |
|---|---|---|---|
| 4,719,613 | 1/1988 | Hirose et al. | 430/945 |
| 4,719,615 | 1/1988 | Feyrer et al. | 369/284 |
| 4,767,696 | 8/1988 | Ishimoto et al. | 430/945 |
| 4,791,023 | 12/1988 | Suzuki et al. | 428/336 |
| 4,852,075 | 7/1989 | Feyrer et al. | 369/100 |
| 5,079,758 | 1/1992 | Clark | 369/284 |

FOREIGN PATENT DOCUMENTS

| | | |
|---|---|---|
| 0136070 | 4/1985 | European Pat. Off. |
| 0232964 | 8/1987 | European Pat. Off. |
| 0271977 | 6/1988 | European Pat. Off. |
| 0338776 | 10/1989 | European Pat. Off. |

OTHER PUBLICATIONS

J. Vac. Sci. Technol., 18(1), 105-109 (1981)
Japan J. Appl. Phys. 22, 340-343 (1983).

*Primary Examiner*—Patrick J. Ryan
*Assistant Examiner*—Elizabeth Evans
*Attorney, Agent, or Firm*—Sughrue, Mion, Zinn, Macpeak & Seas

[57] ABSTRACT

An erasable optical recording medium having a recording layer formed by a transparent and crosslinked polymer having Tg within a range of 50° C.-300° C. and exhibiting a rubbery state at a temperature higher than the Tg, in which is incorporated a dye which absorbs a light and converts it to heat; and a method for recording, reading and/or erasing by using said medium.

12 Claims, No Drawings

ERASABLE OPTICAL RECORDING MEDIUM AND METHOD FOR WRITING, READING AND/OR ERASING THEREOF

This is a continuation-in-part of application Ser. No. 07/466,188 filed Jan. 17, 1990, now abandoned.

BACKGROUND OF THE INVENTION

Various approaches have been tried for preparing a recording medium using an organic dye. For example, J. Vac. Sci. Technol., 18 (1), 105–109 (1981) discloses a method to form a recording medium by coating the organic dye on a substrate as it is. A method to form a recording medium wherein the organic dye is incorporated in a polymer such as polystyrene having a Tg of about 80° C., exhibiting plastic state at a temperature higher than the Tg, having a low flow temperature and having a low viscosity at a temperature higher than the flow temperature, and the resulting mixture is coated on a substrate to form a recording layer is known (Japan J. Appl. Phys., 22 (2), 340–343 (1983).

When writing on these optical recording media, there is employed a process in which a laser light corresponding to an absorbing wave length of the dye is radiated thereon, the radiated laser light is absorbed by the dye in the recording layer and converted into heat to heighten a temperature, whereby an irreversible deformation of the recording layer, for example a pit, is formed at the radiated spot.

The above method utilizing the irreversible deformation has advantages from a view point of a stable recording of information; however, it is not suitable for a use of the optical recording medium with multiple repeats of writing and erasing.

In the former method, once the medium is recorded, it is essentially unable to recover the medium to the original state by erasing the record, since the record is performed by forming the pit through sublimation, decomposition or scattering of the dye.

In the latter method, the record is performed by the pit formed through deformation by polymer flow. Therefore, for erasing the once-formed pit, there is required a troublesome process such as (a) a whole track containing the pits is subjected to C.W.-erasing process several times with laser light radiation of a high intensity C.W. (continuous wave) or (b) a whole medium is heated by some other method such as heating in an oven at 100° C.–150° C. for about 1 hr, whereby the polymer flow causes the pits to vanish, and (c) the resulting medium is cooled slowly. In spite of the above troublesome process, it is not always satisfactory.

There was further proposed an erasable recording medium composed of (i) a dye-containing expansion layer which forms a dome-like bump by expansion caused by heating with a spot laser light radiation and (ii) a dye-containing retention layer to sustain this form (cf. U.S. Pat. Nos. 4,719,615 and 4,852,075. When recording on this medium, a laser light radiation at the absorbing wave length ($\lambda_1$) of the dye incorporated in the expansion layer is applied, forming the bump in the expansion layer and the retention layer keeps the form. When vanishing the thus recorded bump, a laser light radiation at the absorbing wave length ($\lambda_2$) of the dye incorporated in the retention layer is applied, thereby heating the retention layer higher than its Tg, at which it is difficult for the retention layer to keep the bump form.

According to the method described above, it is surely possible to carry out recording and erasing reversibly; however, it still has following problems: (a) it requires two laser lights of different wave length for recording and erasing, (b) it requires two dyes of different maximum absorption wave length, and (c) a fabrication of the laminate structure of the medium is complicated.

In addition to an organic optical recording medium having the problems mentioned above, there is proposed an erasable optical recording medium utilizing a phase transformation of an inorganic crystal by a thermal mode. Since these media are composed of an inorganic material, a convenient film formation such as coating, casting, etc. cannot be applicable, and a relatively complicated and expensive film formation such as vacuum vapor deposition, sputtering, etc. must be employed.

SUMMARY OF THE INVENTION

This invention provides an erasable optical recording medium with a simple structure, and being readily produced accordingly.

This invention provides an erasable optical recording medium having a recording layer composed of a dye and a transparent and crosslinked polymer having a Tg within a specific range and exhibiting a rubbery state at a temperature higher than the Tg.

The recording layer of the invention is a homogeneous, unitary layer from the viewpoint of the content and dispersion state of the coloring element being homogeneous throughout the recording layer and the nature of the polymer matrix being homogeneous throughout the recording layer. Thus, if a "sample" were to be taken at any point in the recording layer it would be the same as a "sample" from any other point in the recording layer. Thus, the recording layer does not require separate and distinct "recording" and "erasing" layers. The recording layer exhibits by itself both properties as an expansion layer and a holding layer. That is, the recording layer expands to form a bump with exposure to stronger radiation at a temperature much higher than Tg, and is rapidly cooled down to a temperature lower than Tg when the radiation is stopped and then retains or holds the bump form. The polymer, which retains the formed bumps, can be radiated with radiation which is not so strong as to cause expansion of the polymer at a temperature not much higher than Tg (e.g., slightly higher than Tg) but sufficient to cause an annealing of the polymer to diminish the bump.

This invention also provides an optical recording method using the above mentioned medium.

DESCRIPTION OF THE PREFERRED EMBODIMENT

The recording layer having the earlier discussed capabilities exhibits its intended function most effectively when the polymer(s) constituting the recording layer exhibit(s) the following three physical properties at the same time:

(a) Tg: 50°–300° C., preferably 60°–250° C., more preferably 80°–200° C.;

(b) Modulus of elasticity: 50–1000 Kg/mm$^2$, preferably 80–700 Kg/mm$^2$, at room temperature; and at a temperature 20° C. higher than Tg, the value decreases to less than ½, more preferably less than 1/10, of the value at room temperature, and the polymer does not melt at a temperature 20° C.

higher than Tg, and preferably the polymer does not exhibit a melting point at any temperature;

(c) Thermal expansion coefficient: more than $1\times10^{-5}$, preferably more than $1\times10^{-4}$ and less than $10^{-3}$ [cm/cm/deg] at a temperature 10° C. higher than Tg.

The modulus of elasticity at a temperature 20° C. higher than Tg usually falls in the range of 2–40 Kg/mm², preferably 5–25 Kg/mm².

Tg is measure with a Differential Scanning Calorimeter, Modulus of elasticity with Dynamic rheometer, and Thermal expansion coefficient with Thermal mechanical analyzer.

The erasable optical recording medium according to this invention is essentially composed of a transparent or opaque substrate and an optical recording layer supported thereon, said optical recording layer has a Tg within a range of 50° C.–300° C. and is composed of a transparent and crosslinked polymer exhibiting a rubbery state at a temperature higher than the Tg and a dye incorporated therein.

The substrate may be a rigid or flexible substrate of an inorganic material or an organic resin. As for the inorganic material, glass, aluminum, etc. are mentioned, and as for the organic material, there are mentioned poly(alkyl methacrylate) such as poly(methyl methacrylate), poly(n-butyl methacrylate) and poly(n-propyl methacrylate), polystyrene, poly(α-methylstyrene), polyethylene, polypropylene, polycarbonate, polyacrylonitrile, co-poly(styrene-butadiene), poly(vinyl chloride), co-poly(ethylene-vinyl acetate), poly(4-methyl-pentene-1), and aromatic based polyester such as poly(ethylene terephthalate) and poly(ethylene 2,6-naphthalate).

Of these substrates, poly(methyl methacrylate), polycarbonate, poly(ethylene terephthalate), poly(ethylene 2,6-naphthalate) and poly(4-methyl-pentene-1) are preferred from a view point of dimensional stability, processability, etc.

The thickness of the substrate to be formed from the material mentioned above is not critical; however, the thickness of 0.5 mm–5 mm is normally selected to form the rigid medium, and the thickness of 5 μm–500 μm, preferably 10 μm–200 μm is preferred for making the flexible medium.

The polymer material composing the recording layer of the present invention must posses bump forming capability upon heating (e.g., by laser radiation) and resistance to flow deformation. A crosslinked polymer is particularly preferable as such material. It is further necessary for the polymer material of the recording layer according to the present invention to simultaneously satisfy the following three physical properties at the same time:

(a) Tg: 50°–300° C., preferably 60°–250° C., more preferably 80°–200° C.;

(b) Modulus of elasticity: 50–1000 Kg/mm², preferably 80–700 Kg/mm², at room temperature; and at a temperature 20° C. higher than Tg, the value decreases to less than ½, more preferably less than 1/10, of the value at room temperature, and the polymer does not melt at a temperature 20° C. higher than Tg, and preferably the polymer does not exhibit a melting point at any temperature;

(c) Thermal expansion coefficient: more than $1\times10^{-5}$, preferably more than $1\times10^{-4}$ and less than $10^{-3}$ [cm/cm/deg] at a temperature 10° C. higher than Tg.

When the polymer material simultaneously exhibits the above properties, bump formation can be efficiently performed at a much higher temperature, at least 20° C., more preferably 50° C. higher, than Tg, and the bump can be kept sufficiently at a normal temperature lower than Tg. Further, erasure of the recording can be achieved at a temperature higher than Tg. It is desirable, however, that the temperature for erasure not be excessively higher than Tg, and preferably it should be at most 10° C. higher than Tg. If the temperature for erasure is too high, bump formation predominates bump erasure to result in insufficient erasure or residual bumps.

In the recording medium according to the present invention, since the one identical homogeneous polymer layer bears the responsibility of both recording and erasing, the suitable balance of the physical properties mentioned above is equally important for efficient and good recording and erasing. For sensitive recording, the low Tg and the low modulus of elasticity at a temperature $\geq$Tg are preferable. The higher thermal expansion coefficient at a temperature $\geq$Tg is also preferred. For stable bump retention until erasure, the higher Tg and the high elasticity at a temperature $\leq$Tg are preferable. For efficient erasing, the low Tg and the great decrease of the modulus of elasticity at a temperature $\geq$Tg are preferable.

Thus, contradictory requirements should be satisfied for good data recording, data retention and data erasing. Due to the properties mentioned above, when the spot radiation of the laser light is applied on the medium to elevate temperature at the spot up to 300° C.–800° C., for example, that portion causes a rush expansion and forms a distinctive bump.

Furthermore, said polymer is the transparent and crosslinked polymer. According to being transparent, the radiated laser light is not absorbed by the polymer and effectively absorbed by the dye. According to being crosslinked, it can be possible to prevent an occurrence of polymer flow during the thermal expansion mentioned above, whereby the deformation by polymer flow readily resulting in the irreversible deformation described in the prior art discussion can be avoided.

The polymer exhibits a rubbery state at temperatures higher than the Tg. According to this property, it can possess a function to recover its form from the deformed state to the original state, when it is kept at the temperature higher than Tg for a relatively longer period. The term "relatively longer period" means a longer period than the spontaneous cooling period during the aforementioned bump formation.

Fixing the eyes to a specific spot, the bump formation can be achieved by the way that (1) the laser light radiation is applied for a desired period to make the thermal expansion and shut down rapidly, (2) the spontaneous cooling of the polymer is completed before the thermal expansion vanishes into its original form according to the rubbery property of the polymer, and (3) the polymer gains its glassy property and keeps the expanded form.

Therefore, if the polymer is kept at the temperature higher than Tg for the relatively longer period, longer than the rapid spontaneous cooling period, the deformed form can be recovered into its original form due to the rubbery property of the polymer.

As easily understood from the explanation above, the temperature employed in the bump formation previously stated is the higher one than the above stated temperature.

As for one type of the polymer, there is mentioned a polymer in which a soft segment exhibiting elastic property at normal temperature is bound with a hard segment having high elasticity in a dispersed state to exhibit thermoelastic property. As for the polymer having said characteristic, there are mentioned a thermoplastic elastomer which is glassy at normal temperature and obtained by crosslinking the soft segment with the hard segment having a functional group participating in the crosslinking reaction, in which the soft segment is selected from a group composed of an oligomer or polymer derived from one or more than one monomer of diene based derivatives such as chloroprene, butadiene and isoprene; an aliphatic polyether; an aliphatic and/or aromatic polyester; an aliphatic and/or aromatic polyurethane; etc. The hard segment mentioned above may be selected depending on a functional group of the soft segment to be used.

When using the soft segment having a hydroxyl group, a polyfunctional isocyanate can be preferably used as the hard segment. In case of the soft segment having isocyanate group, polyfunctional alcohols and polyfunctional amines are preferable as the hard segment. The polyfunctional amines are also preferable when the soft segment having an epoxy group is used. These combinations ensures crosslinking reaction by heat treatment.

When using the soft segment having an ethylenic double bond such as vinyl, (meth)acrylate, etc. as the functional group, the crosslinking reaction can be performed by heating or light radiation in the presence of a radical initiator, optionally under addition of a polyfunctional (meth)acrylate as the hard segment if desired.

As for the diene based soft segment, a polymer having a polymeric or co-polymeric constitutional unit derived from butadiene, chloroprene and/or isoprene, and having a hydroxy, epoxy and/or isocyanate group at its terminal is especially preferable.

The polymer having terminal epoxy groups can be prepared easily by terminating polymerization by introducing an epihalohydrin in an anion polymerization. One having terminal hydroxy groups can be prepared by reacting an acid with the epoxy group of the polymer mentioned above. By reacting a diisocyanate with a polymer having terminal hydroxy groups, one having terminal isocyanate groups can be obtained. As for the diisocyanate used for terminal modification, an aromatic, alicyclic and aliphatic diisocyanate such as 1,4-phenylene diisocyanate, tolylenediisocyanate, 4,4'-diphenylmethane diisocyanate 1,4-cyclohexane diisocyanate and tetramethylene diisocyanate are mentioned.

As for the aliphatic polyether, polyethylene glycol, polypropylene glycol, polytetramethylene glycol or a copolymer thereof is preferably used.

As for the aliphatic or aromatic polyester, a polymer or copolymer obtained by reacting ethylene glycol, tetramethylene glycol, diethylene glycol, the diol type polyether mentioned above, and/or a polyfunctional alcohol such as neopentyl glycol, trimethylol propane, etc. with a dicarboxylic acid such as adipic acid, sebacic acid, maleic acid, fumaric acid, phthalic acid, etc. is preferably used.

As for the aliphatic and aromatic polyurethane, a polymer or copolymer obtained by reacting the aliphatic diol or polyether mentioned above with the aromatic or aliphatic diisocyanate mentioned above is preferred, and ones having hydroxy group at both ends are especially preferable.

In addition to ones having hydroxy groups at both ends, ones having isocyanate groups or epoxy groups at both ends are preferably used as for the polyol, polyester or polyurethane. One having the isocyanate group can be prepared by reacting a precursor having hydroxy groups at its both ends with the diisocyanate mentioned above, and one having the epoxy group can be prepared by reacting with ethylenechlorohydrin, etc.

As for the polyfunctional isocyanate as the hard segment used in crosslinking reaction, an aromatic or alicyclic diisocyanate such as 1,4-diphenyl diisocyanate, tolylenediisocyanate, 4,4'-diphenylmethane diisocyanate, 1,4-cyclohexane diisocyanate, etc., a 1:3 addition product of trimethylol propane with tolylenediisocyanate and an aromatic polyfunctional isocyanate such as polymethylene polyphenylene polyisocyanate may be used preferably.

As for the polyfunctional alcohol as the hard segment used in the crosslinking reaction, glycerin trimethylol propane, neopentyl glycol, pentaerythritol, etc. may be used.

As for the polyfunctional amine as the hard segment used in the crosslinking reaction, 4,4'-diaminodiphenylsulfone, methylene bisorthochloroaniline, methylene dianiline, triethylene tetramine, diethylene triamine, etc. may be used.

As for the polyfunctional (meth)acrylate as the hard segment used in the crosslinking reaction, there are mentioned trimethylolpropane (meth)acrylate, pentaerythritol tri(meth)acrylate, pentaerythritol tetra(meth)acrylate, dipentaerythritol hexa(meth)acrylate, a 2:1 addition product of pentaerythritol tri(meth)acrylate with tolylene diisocyanate, etc.

As for another type of the polymer which may be used in the invention, there is mentioned plastics which are prepared by introducing a crosslinkable structure into originally thermoplastic polymers. Examples are a modified polymethylmethacrylate obtained by using a comonomer having 2 or more than 2 ethylenic double bonds or a partially crosslinked product obtained by crosslinking a modified polystyrene such as an unsaturated polyester, modified phenoxy resins having cinnamoyl, (meth)acryloyl or cinnamilidene group under ultraviolet rays or heat.

Further as for the other type of the polymer which may be employed in the invention, there are mentioned a thermosetting resin (crosslinked resin) such as an aromatic epoxy resin, phenol resin and melamine resin; and a light- and thermo-hardening resin such as epoxy (meth)acrylate resin and novolac (meth)acrylate resin which exhibits thermoelasticity as it is.

The potential of recovering from deformation of these polymer at the temperature of Tg or higher than Tg can be controlled by selecting the property and quantity of the hard segment (crosslinking agent) and degree of crosslinking.

Preferable degree of crosslinking cannot be defined absolutely since it depends on the properties of the soft segment and hard segment and the combination thereof; however, it can be in the range of 1/100–1/10000.

The degree of crosslinking according to the invention is defined as a reciprocal number of an average molecular weight per one crosslinking unit. Therefore, the degree of crosslinking 1/100 means that it contains one crosslinking unit per molecular weight 100.

As for a light absorber used in this invention, an organic or inorganic dye which has high compatibility with the above mentioned polymer and is stable to heat and a laser light can be used. The organic dye is preferable. The dye has a function to effectively absorb a radiated light such as the laser light, to convert it to heat and increase the temperature of the matrix polymer.

Examples of the preferable dye are organic dyes such as polymethine based dyes, pyrylium based color element, thiapyrylium based color element, squarilium based color element, azulenylium based color element, cyanine based dyes, phthalocyanine based dyes such as phthalocyanines and naphthalocyanines; dithiol metal complexes such as dithiol nickel complexes; naphthoquinone and anthraquinone based dyes; and triphenylmethane based dyes.

Some of the individual examples are shown below:
(1) 1,3,3-Trimethyl-2-[7-(1,3,3-trimethyl-2-indolinylidene)-1,3,5-heptatrienyl]-3H -indolium iodide,
(2) 1,1,3-Trimethyl-2-[7-(1,1,3-trimethylbenzindolin-2-ylidene)-1,3,5-heptatrienyl]-1H-benzindolium perchlorate,
(3) 1-Ethyl-2-[7-(1-ethyl-2(1H)-quinolylidene)-1,3,5-heptatrienyl]quinolinium iodide,
(4) Dihydro-3-[2-hydroxy-3-(5-isopropyl-3,8-dimethyl-1-azulenyl)-4-oxo-2-cyclobuten-1-ylidene]-7-isopropyl-1,4-dimethylazulenylium hydroxide,
(5) Bis(chalcogenopyrylo)methine,
(6) 1,4-Diaminoanthraquinone-(N-n-hexyl)-3'-thioxo-2,3-dicarboximide,
(7) {4-[3-[4-(N,N-dimethylamino)-2-hydroxyphenyl]-2-hydroxy-4-oxo-2-cyclobuten-1-ylidene]-3 -hydroxy-2,5-cyclohexadien-1-ylidene}-N,N-dimethylamine hydroxide,
(8) Tetra-tert-butylphthalocyanine vanadyloxy complex,
(9) Tetra-isoamilnaphthalocyanine vanadyloxy complex,
(10) Tetrachloro-dodecaphenylthiophthalocyanine vanadyloxy complex,
(11) Bis(2-cyanoethoxydimethylsiloxy)silicon naphthalocyanine,
(12) Bis(3-carboethoxypropyloxy)silicon naphthalocyanine,
(13) 1,5-Bis(p-diethylaminophenyl)-1,5-bis(p-diethylaminophenyl)-2,4-pentadienol perchlorate.

The recording layer in this invention is composed of a mixture of the above mentioned polymer with said dye incorporated therein, which is supported on the substrate in the thickness of about 0.1 $\mu$m–about 10 $\mu$m, preferably 0.5 $\mu$m–5 $\mu$m.

Content of the dye can be varied depending on properties of the polymer and the dye; however, it is generally within a range of 1 wt. %–50 wt. %, preferably 5 wt. %–30 wt. % in said mixture.

In addition to the dye, the layer may be added with a singlet state oxygen quencher represented by a nickel complex. Content of the singlet state oxygen quencher is generally 1 wt. %–20 wt. % in said mixture. In this case however, a total content of the dye and the singlet state oxygen quencher is preferably not more than 30 wt. % in said mixture.

Dye content of lower than 1 wt. % results in a not preferable sensitivity of recording because of a low efficiency of heat generation. Dye content of higher than 30 wt. % is not preferable because it makes the thermal expansion of the medium lower, the formation of the clear bump difficult and the mechanical property of the medium lower.

Such recording layer can be formed by first mixing a pre-crosslinked resin with a desired amount of the dye using a solvent, coating the resulting solution on the substrate and effecting crosslinking reaction on the substrate. There is not limitation to the coating method; however, a spin-coating method, casting method, bar-coating method, doctor knife method, gravure coat method, etc. may be employed.

As for the solvent preferably used therein, aliphatic hydrocarbons such as hexane and cyclohexane, aromatic hydrocarbons such as toluene and xylene, alcohols such as methanol and ethanol, haloalkanes such as chloroform and methylene chloride, esters such as ethyl acetate and butyl acetate, ketones such as acetone and methyl ethyl ketone, glymes such as ethylene glycol monomethyl ether and ethylene glycol monobutyl ether, ethers such as tetrahydrofuran and dioxane, nitromethane, acrylonitrile and a mixture thereof are mentioned.

When an urethane-crosslink type resin and/or epoxy-crosslink type resin is used, it may be crosslinked by heating at a desired temperature for a desired period after coating. Heating temperature will be generally 50° C.–200° C., preferably 70° C.–150 ° C. Higher temperature over the range is generally not preferable because of causing deterioration of the substrate or the dye. Lower temperature over the range is also generally not preferable because of unsufficient proceeding of hardening reaction. Period for the hardening reaction is generally within a range of 5 min–10 hr, preferably 10 min–5 hr.

When a resin having a radical polymerisable group such as (meth)acrylate group is used, thermosetting method, ultraviolet ray hardening method, electron beam hardening method, etc. can be employed for hardening.

When thermosetting method is employed, a mixture of the resin with the dye, generally further added with the radical initiator, is coated on the substrate and heated to carry out crosslinking and hardening. There is no limitation to the initiator; however, azobisisobutyronitrile, benzoylperoxide, dicumylperoxide, etc. are generally used. The temperature of heating within 50° C.–150° C. range, preferably 70° C.–120° C. range, is generally employed.

When ultraviolet ray hardening method is employed, a mixture of the resin with the dye, generally further added with the photoinitiator, is coated on the substrate and subjected to the ultraviolet ray radiation to perform crosslinking reaction. As for the photoinitiator, a benzophenone based initiator such as benzophenone and Michler's ketone; a diketone based initiator such as benzyl and phenylmethoxydiketone; a benzoin based initiator such as benzoin ethyl ether and benzyl dimethyl ketal; an acetophenone based initiator such as 4'-methylmercapto-2-morpholino-2-methyl-propiophenone; a thioxanthone based initiator such as 2,4-diethylthioxanthone; and a quinone based initiator such as 2-methylanthraquinone and camphorquinone are preferably used. An amine based promoter may be used together if necessary. As for a source of the ultraviolet rays to be used, a low pressure mercury lamp, a moderate pressure mercury lamp, a high pressure mercury lamp, a metal halide lamp, etc. are preferably mentioned.

In the optical recording medium according to the invention, a light reflection layer can be arranged in addition to the recording layer described herein above to increase the reflectivity of the medium. The light reflection layer may be arranged either between the substrate and the recording layer or over the recording layer. As for the reflection layer, a thin metal layer and/or a thin layer of a high reflective dye may be used. As for the metallic reflection layer, a metal thin layer of Al, Ag, Au, etc. are preferably used. This metal layer is formed on the substrate or the recording layer with a vacuum process (vapor deposition, sputtering). When using the high reflective dye, the layer can be formed with a coating method as well as the vacuum process. There is no limitation to the high reflective dye to be used; however, a cyanine based dye and a naphthalocyanine based dye are preferably mentioned. These dyes can be used by themselves or with a film forming polymer. The thickness of the reflection layer is selected from 10 Å–1000 Å range, preferably 50 Å–500 Å range.

The optical recording medium according to the invention may have a protective layer for the recording layer described above. The protective layer may be arranged via an air gap or via a very soft resin layer (compression layer) over the recording layer. The thickness of the gap or the compression layer may be within a 1 μm–100 μm range, preferably a 2 μm–20 μm range. In both cases, the protective layer can be placed by adhering a disc form or film form protective layer to the medium. When using the compression layer, the protective layer can also be formed by a coating method. As for the material of the protective layer, there is no limitation so far as it is optically transparent and hard. As typical examples, polymethylmethacrylate, polycarbonate, polyethylene terephthalate, epoxy resin and novolac resin are applicable.

This invention also relates to a recording, reading and/or erasing method for the erasable optical recording medium which has one polymer layer, as the recording layer, containing the dye which absorbs the light and converts it to heat, which polymer is a transparent and crosslinked polymer having a Tg within a range of 20° C.–200° C. and exhibiting a rubbery state at a temperature higher than Tg; which method comprises i) a process wherein a high intensity laser light corresponding to an absorption wave length of the dye is turned on and off, relating to a specific spot, whereby the rush heating and subsequent rapid cooling occurs at the spot, through which a bump formation by thermal expansion and a bump setting by rapid cooling is performed to record the information;

(ii) a process wherein a lower intensity laser light corresponding to the absorption wave length of the dye is radiated on the spot where the bump has been formed, whereby the bump area is heated up to the temperature higher than Tg to exhibit a rubbery state, through which the bump substantially vanishes; and/or (iii) a process wherein a further low intensity laser light corresponding to the absorption wave length of the dye is applied on the recording layer in which the bump is formed, a reflection light from the medium is detected and an existence of the bump is checked from its reflection strength, through which the reading of information is performed.

The laser resource to be used is selected by depending on the dye used. When a near infrared ray-absorbing dye is used, a gallium/arsenic semiconductor laser can be used; and when a visible ray-absorbing dye is used, a helium.neon laser, argon laser, krypton laser, ruby laser or dye laser can be used.

By applying the laser radiation on the spot where the bump should be formed and then stopping the laser radiation rapidly or moving the medium, the laser radiation on that spot is rapidly stopped and the spot is spontaneously and rapidly cooled. By this cooling, the polymer is cooled sufficiently to become into exhibiting the glassy state before the bump having been formed by thermal expansion with the laser radiation recovers its original form, whereby the bump is kept as it was and the recording is performed.

On the other hand, when there is applied the laser radiation with an energy level at which the polymer does not make a large thermal expansion but a temperature thereof is kept higher than Tg, the polymer is changed from the glassy state to the rubbery state, and the bumped polymer recovers its original form by its rubbery elasticity, whereby the erasing of the record is performed.

It is difficult to generally define the radiation energy in the recording and the erasing. Each energy level being required and being sufficient varies depending on the types of the polymer and the dye to be used. It also depends on a control of each radiation period. However, one example is mentioned without any limiting intention as below: in recording, the laser light is radiated at an out-put of 5 mW–30 mW, preferably 7 mW–20 mW for 5 μsec–0.1 μsec. When the laser radiation is moderately out of the range of the above radiation condition, the recording becomes insufficient, and when it is stronger than the range of condition, the deformation by polymer flow occurs in the medium to sometimes make the subsequent erasing impossible. In erasing the information, the laser light is radiated at an output of 1 mW–10 mW, preferably 2 mW–6 mW for 0.1 μsec–10 μsec. In reading the information from the recorded medium wherein the bump is formed, there is applied the laser light radiation of lower energy level than that in erasing, and a variation of intensity of the light reflected from the medium is detected, thereby reading the information. The energy level in this case also depends on the properties of the polymer and the dye. As for an example, there is mentioned without any limiting intention as below: recorded bits are scanned with a C.W. light at 1 m/s–30 m/s linear velocity using the laser light of 0.01 mW–5 mW, preferably 0.1 mW–1 mW out-put, and the change of reflection from the medium is detected, whereby the reading of the record can be performed.

The physical properties of the polymers used in the following Examples were as follows:

| Example No. | Tg (°C.) | Modulus of Elasticity (Kg/mm²) | | Thermal expansion coefficient (1/°C.) |
| --- | --- | --- | --- | --- |
| | | 25° C. | Th** | |
| 1 | 60 | 90 | 2 | $1 \times 10^{-4}$ |
| 2 | 84 | 78 | 1 | $2 \times 10^{-4}$ |
| 3 | 74 | 94 | 4 | $6 \times 10^{-5}$ |
| 4* | — | — | — | — |
| 5 | 102 | 120 | 9 | $4 \times 10^{-5}$ |

*This polymer may have similar physical properties to those of Example 3.
**The temperature 20° C. higher than Tg.

EXAMPLE 1 tional urethane acrylate Ebecryl-220 (UCB Inc.) of the following formula:

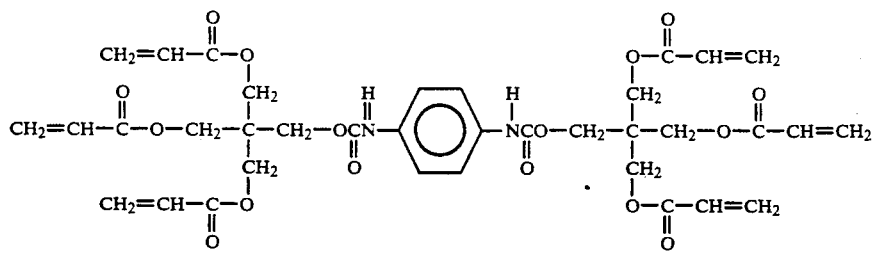

A liquid chloroprene rubber having hydroxy groups at its molecular termini [numerical average molecular weight: 5,100, Trade name: FH-050 (DENKI KAGAKU KOGYO)] was mixed with a reaction product of trimethylol propane with tolylenediisocyanate in 1:3 ratio [Trade name: CORONATE L] into a ratio of hydroxyl/isocyanate group=0.5, and diluted 5-fold with chloroform. Into this solution were added tetrachlorododecaphenylthio phthalocyanine vanadyloxy complex (NIR-12) in an amount of 10 wt. % based on a solid content, the resulting solution was coated on a glass plate substrate about a 3 μm thickness, and the solvent was dried up. Then the coating was heat-treated at 120° C. for 1 hr in a drier to carry out the crosslinking reaction of the polymer. The crosslinked polymer had the Tg of about 60° C. and the thermal expansion constant of $1 \times 10^{-4}$/°C. On the obtained coating, there was applied a 10 mW semiconductor laser light at 830 nm oscillating wave length with about 1 μm diameter focussed with a lens. A 1.5 μm diameter clear bump was formed on the medium surface. Then the same laser light of 2 mW in 5 μsec pulse was radiated on the recorded spot. The bump disappeared not to be recognized with microscopic observation (×400). This indicated that the above medium can be used as the erasable optical recording medium.

EXAMPLE 2

A crosslinked coating was formed in a way same as Example 1 except that NIPPOLLAN 125 (NIPPON POLYURETHANE KOGYO Ltd.) (a polyester with an average molecular weight of 700 and a hydroxyl value of 160-180, prepared by reacting phthalic acid with polyfunctional alcohols such as trimethylol propane, neopentyl glycol, etc.) was used instead of the chloroprene rubber having hydroxy groups at its molecular termini in such a combination that the amount of the functional group thereof was equal to that of CORONATE L (OH/NCO=1). The Tg of the coating was 85° C. By applying the 10 mW semiconductor laser light at 830 nm oscillating wave length in a 1 μs pulse under the same condition as in Example 1, a clear bump of 1.2 μm diameter was formed on the medium surface. Then by applying the same laser light on the recorded spot at 2 mW in a 5 μs pulse, the bump vanished not to be recognized by the microscopic observation (×400). This indicated that the above medium can be used as the erasable optical recording medium.

EXAMPLE 3

A 5 wt. % chloroform solution was prepared in the same way as in Example 1 except that a blend matrix of urethane acrylate TB-3001 (Trade name: Optical hardening resin TB-3001; Three Bond Inc.) with polyfunctional urethane acrylate Ebecryl-220 (UCB Inc.) of the following formula:

2:1 addition product of pentaerythritol triacrylate with 1,4-phenylene diisocyanate was used instead of the crosslinked polyurethane and 1,5-bis(p-diethylaminophenyl)-1,5-bis(p-diethylaminophenyl)-2,4-pentadienol perchlorate (IR-820, NIPPON KAYAKU Ltd.) was added instead of the NIR-12. The resulting dope was casted on a glass plate substrate in an about 3 μm thickness, the solvent therein was dried up and the resulted coating was subjected to a high pressure mercury lamp radiation for 10 min in a nitrogen atmosphere to carry out crosslinking and hardening of the resin. The Tg of the coating was 52° C. By applying on the thus obtained medium the 10 mW semiconductor laser light at 830 nm in a 1 μs pulse as in Example 1, a clear bump of 1.5 μm diameter was formed on the medium surface. Then by applying the same laser light on the recorded spot at 2 mW in a 5 μs pulse, the bump vanished not to be recognized by the micrographic observation (×400). This indicated that the above medium can be used as the erasable optical recording medium.

EXAMPLE 4

A medium was prepared in a same way as in Example 3 except that a 9:1 blend matrix of the hexafunctional urethane acrylate U-1246A (Trade name: NK-oligo U-1246; SHINNAKAMURA KAGAKU Ltd.) with the monofunctional acrylate M-5700 (Trade name: Aronix M-5700; TOA GOSEI Ltd.) of the following formula:

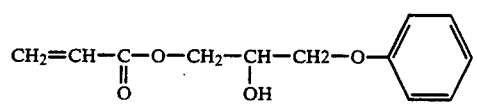

was used instead of the urethane acrylate and 3 wt. % of Irgacure 907 (Ciba-Geigy Ltd.) of the following formula:

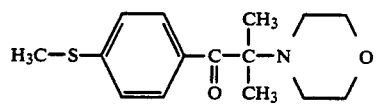

4'-methylmercapto-2-morphorino-2-methylpropiophenone was further added. The Tg of the coating was 62° C. By applying on the thus obtained medium the 10 mW semiconductor laser light at 830 nm in a 1 μs pulse as in Example 1, a clear bump of 1.6 μm diameter was formed on the medium surface. Then by applying the same laser light on the recorded spot at 2 mW out-put in a 5 μs, the bump vanished not to be recognized by the microscopic observation (×400). This indicated that the above medium can be used as the erasable optical recording medium.

EXAMPLE 5

The Epicoat 828 (YUKA CHELLEPOXY Co. Ltd.) of the following formula:

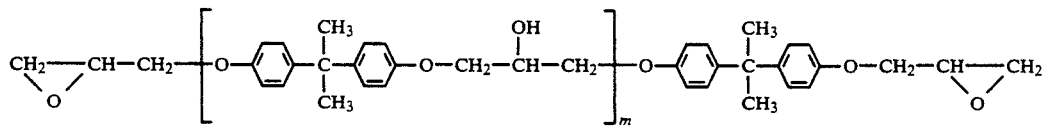

epoxy equivalent: 184–194
average molecular weight: 380 as an epoxy resin having epoxy group in its molecular termini was mixed with diethylene triamine as a polyfunctional amine in a ratio of epoxy group/amino group=1.0, and diluted with chloroform to 10 wt. %. Then into the solution was added the above mentioned NIR-12 in 10 wt. % based on the total solid content, the resulting solution was coated on a glass plate substrate in an about a 3 μm thickness and the solvent therein was dried up. The coating was heat-treated in the drier at 120° C. for 1 hr to carry out crosslinking and hardening. The Tg of the coating was 70° C. By applying on the thus obtained medium the 10 mW semiconductor laser light at 830 nm in a 1 μs pulse as in Example 1, a clear bump of 1.4 μm diameter was formed on the medium surface. Then by applying the same laser light on the recorded spot at 2 mW out put in a 5 μs pulse, the bump vanished not to be recognized by the microscopic observation. This indicated that the above medium can be used as the erasable optical recording medium.

What we claim is:

1. An erasable optical recording medium comprising a recording layer which comprises a unitary transparent and crosslinked polymer layer, where the polymer of the polymer layer has a Tg within the range of 60° C.–250° C., a modulus of elasticity of 80–700 Kg/mm$^2$ at room temperature, and at a temperature 20° C. higher than Tg, the value decreases to less than 1/10 of the value at room temperature, and the polymer does not melt at a temperature 20° C. higher than Tg, the polymer does not exhibit a melting point at any temperature and has a thermal expansion coefficient of more than $1 \times 10^{-4}$ and less than $10^{-3}$ (cm/cm/deg) at a temperature 10° C. higher than Tg, which polymer exhibits a rubbery state at a temperature higher than the Tg and which polymer has homogeneously incorporated therein a dye in an amount of 1 wt. %–50 wt. % which absorbs radiation and converts the radiation to heat, wherein said polymer layer has a thickness of about 0.1 μm to about 10 μm.

2. The erasable optical recording medium as claimed in claim 1 wherein the dye has a maximum absorption in the near infrared region.

3. The erasable optical recording medium as claimed in claim 1 wherein the Tg of the polymer is within a range of 60° C.–250° C.

4. The erasable optical recording medium as claimed in claim 1 wherein the polymer layer has the thickness of 0.5 μm–5 μm.

5. The erasable optical recording medium as claimed in claim 1 wherein the polymer layer contains the dye of 5 wt. %–30 wt. %.

6. The erasable optical recording medium as claimed in claim 1 wherein a high reflection layer is arranged in addition to the recording layer.

7. The erasable optical recording medium as claimed in claim 6 wherein the high reflection layer is composed of a metal layer of 0.01 μm–0.1 μm thick.

8. The erasable optical recording medium as claimed in claim 1, wherein said polymer layer has a Tg of 80°–200° C., a modulus of elasticity of 80–700 Kg/mm$^2$ at room temperature and at a temperature 20° C. higher than Tg, the value decreases to less than ½ of the value at room temperature, and the polymer does not melt at a temperature 20° C. higher than Tg, the polymer does not exhibit a melting point at any temperature and has a thermal expansion coefficient of more than $1 \times 10^{-4}$ and less than $10^{-3}$ (cm/cm/deg) at a temperature 10° C. higher than Tg.

9. The erasable optical recording medium as claimed in claim 1, wherein said polymer layer has a Tg of 80°–200° C., a modulus of elasticity of 80–700 Kg/mm$^2$ at room temperature and at a temperature 20° C. higher than Tg, the value decreases to less than 1/10 of the value at room temperature, and the polymer does not melt at a temperature 20° C. higher than Tg, the polymer does not exhibit a melting point at any temperature and has a thermal expansion coefficient of more than $1 \times 10^{-4}$ and less than $10^{-3}$ (cm/cm/deg) at a temperature 10° C. higher than Tg.

10. The erasable optical recording medium as claimed in claim 1, wherein said polymer layer has a Tg of 80°–200° C., a modulus of elasticity of 80–700 Kg/mm$^2$ at room temperature and 2–40 Kg/mm$^2$ at a temperature 20° C. higher than Tg, and the polymer does not melt at a temperature 20° C. higher than Tg, the polymer does not exhibit a melting point at any temperature and has a thermal expansion coefficient of more than $1 \times 10^{-4}$ and less than $10^{-3}$ (cm/cm/deg) at a temperature 10° C. higher than Tg.

11. A method of recording, reading and/or erasing an erasable optical recording medium which has a polymer layer as a recording layer containing a dye in an amount of 1 wt. %–50 wt. % which absorbs light and converts it to heat, which polymer is a transparent and crosslinked polymer having a Tg within a range of 50°–300° C. and exhibiting a rubbery state at a temperature higher than Tg; which method comprises (i) a process wherein a high intensity laser light corresponding to an absorption wave length of the dye is turned on and off, relating to a specific spot, whereby rush heating and subsequent rapid cooling occurs at the spot, through which a bump formation by thermal expansion and a bump setting by rapid cooling is performed to record the information;

(ii) a process wherein a lower intensity laser light corresponding to the absorption wave length of the dye is irradiated on the spot where the bump has been formed, whereby the bump area is heated up to the temperature high than Tg to exhibit a rubbery state, through which the bump substantially vanishes; and/or (iii) a process wherein a further low intensity laser light corresponding to the absorption wave length of the dye is applied on the recording layer in which the bump is formed, a reflection light from the medium is detected and existence of the bump is checked from its strength, through which the reading of information is performed, wherein said polymer layer has a thickness of about 0.1 μm to about 10 μm.

12. An erasable optical recording medium comprising a recording layer which comprises one transparent and crosslinked polymer layer, the polymer having a Tg within the range of 50° C.–300° C., which polymer exhibits a rubbery state at a temperature higher than the Tg, a modulus of elasticity of 50–1000 Kg/mm$^2$ at room temperature, which modulus of elasticity decreases to less than ½ at a temperature 20° C. higher than Tg, and a thermal expansion coefficient of more than $1 \times 10^{-5}$ at a temperature 10° C. higher than Tg; which polymer has homogeneously incorporated therein a dye absorbing radiation and converting the radiation to heat, said dye being present in an amount of 1 wt. % to 50 wt. % and said polymer layer having a thickness of from about 0.1 μm to about 10 μm.

* * * * *